United States Patent [19]

Ogawa et al.

[11] Patent Number: 4,977,201

[45] Date of Patent: Dec. 11, 1990

[54] POLYVINYL CHLORIDE PLASTISOL COMPOSITION

[75] Inventors: Akio Ogawa; Masahiko Shimada, both of Saitama; Kazuhiko Ando, Kanagawa, all of Japan

[73] Assignees: Asahi Denka Kogyo K.K.; A,C,R. Co., Ltd., both of Tokyo, Japan

[21] Appl. No.: 315,524

[22] Filed: Feb. 24, 1989

[30] Foreign Application Priority Data

Mar. 4, 1988 [JP] Japan .................. 63-50747
Apr. 1, 1988 [JP] Japan .................. 63-80689
Sep. 9, 1988 [JP] Japan .................. 63-226182

[51] Int. Cl.$^5$ ............................................. C08L 63/10
[52] U.S. Cl. .................................. 523/400; 523/406; 523/412; 523/415; 523/417; 525/55; 525/65; 525/66; 525/76; 525/77; 525/78; 525/111; 525/111.5; 525/124; 528/295.5; 528/332; 528/393; 528/403
[58] Field of Search ............. 523/400, 406, 412, 415, 523/417; 525/55, 65, 66, 76, 77, 78, 111, 111.5, 124; 528/295.5, 332, 393, 403

[56] References Cited

U.S. PATENT DOCUMENTS 4,093,674 6/1978 Tsutsui et al.
4,871,591 10/1989 Sugimura et al. ............... 427/388.5

Primary Examiner—John Kight, III
Assistant Examiner—S. A. Acquah
Attorney, Agent, or Firm—Flynn, Thiel, Boutell & Tanis

[57] ABSTRACT

The present invention provides a polyvinyl chloride plastisol composition characterized by containing a specified epoxy resin, a blocked isocyanate and, if necessary, a latent curing agent for an epoxy resin as tackifiers. This plastisol composition is excellent in storage stability and can strongly adhere to various metals and various undercoate of metals (such as electro-deposit) by baking even at a relatively low temperature to give a coating which is free from blowing and exhibits excellent adhesion after the immersion in hot water or the heating. Therefore, the composition is useful as a body sealer or undercoat for an automotive body.

11 Claims, No Drawings

POLYVINYL CHLORIDE PLASTISOL COMPOSITION

BACKGROUND OF THE INVENTION

1. Field of the Invention

The present invention relates to a polyvinyl chloride plastisol composition. Particularly, it relates to a vinyl chloride polymer or copolymer plastisol composition which can strongly adhere to the surface of various metals or various undercoats of metals by thermal treatment for a short time at 120° to 200° C., does not cause color deterioration, even by thermal treatment at high temperature, is excellent in storage stability and exhibits excellent adhesion, even after storage.

2. Description of the Prior Art

Up to this time, many studies have been made to improve the adhesion of a polyvinyl chloride plastisol composition to the surface of various metals (particularly bare metals) or various undercoats of metals.

Although the addition of (1) an acrylic monomer, (2) a liquid epoxy resin and a curing agent, (3) a polyamide and a blocked urethane prepolymer (see Japanese Patent Publication No. 52901/1984) or (4) a polyamide and/or a polyamine and a carboxylic acid (see Japanese Patent Laid-Open No. 120651/1984) has been known as means for improving the above adhesion, the plastisol compositions thus prepared are problematic with respect to adhesion attained by thermal treatment at relatively low temperature, color deterioration caused by high-temperature thermal treatment and storage stability, thereby failing to satisfy all of the abovementioned requirements.

SUMMARY OF THE INVENTION

The inventors of the present invention have eagerly studied to overcome these problems and have found that a polyvinyl chloride plastisol containing specific tackifiers can very strongly adhere to the surface of various metals or various undercoats of metals by thermal treatment for a short time at 120° to 200° C. and does not cause color deterioration even by high-temperature thermal treatment, that is, can produce a coating which is improved in adhesion and resistance to and color deterioration by thermal treatment over a temperature range of from relatively low temperature to high temperature (120° to 200° C.), and is excellent in storage stability. The present invention has been accomplished on the basis of this finding.

Namely, a polyvinyl chloride plastisol composition of the present invention comprises (i) a vinyl chloride polymer and/or copolymer,
(ii) a plasticizer,
(iii) a modified epoxy resin containing both unsaturated and hydroxyl groups which is prepared by reacting (iii-1) an epoxy resin having more than one adjacent epoxy group, on the average in its molecule with (iii-2) an unsaturated aliphatic acid, and
(iv) a blocked isocyanate as essential components.

Further, another polyvinyl chloride plastisol composition of the present invention comprises (i) a vinyl chloride polymer and/or copolymer,
(ii) a plasticizer,
(iii) (iii-1) an epoxy resin having more than one adjacent epoxy group, on the average in its molecule or (iii-3) a modified epoxy resin containing both unsaturated and hydroxyl groups which is prepared by reacting (iii-1) an epoxy, resin having more than one adjacent epoxy group, on the an average in its molecule with (iii-2) an unsaturated aliphatic acid, (iv) a blocked isocyanate, and (v) a latent curing agent for an epoxy resin, as essential components.

DETAILED DESCRIPTION OF PREFERRED EMBODIMENTS

The vinyl chloride polymer and/or copolymer (i) to be used in the present invention may be any conventional one. Examples thereof include copolymers comprising vinyl chloride and a comonomer such as vinyl acetate, maleic anhydride, maleate or vinyl ether.

The degree of polymerization of the vinyl chloride polymer or copolymer may be generally 1000 to 1700. ZEON 121, "ZEON 135 J" and ZEON 103 ZX "(products of The Japanese Zeon Co.), DENKA VINYL PA-100" and DENKA VINYL ME-180"(products of Denki Kagaku Kogyo K.K.) and "KANE Vinyl PSL-10", KANE VINYL PSH-10", "KANE VINYL PSM-30" and "KANE VINYL PCH-12" (products of Kanegafuchi Chemical Industry Co., Ltd.), are commercially available examples of the vinyl chloride polymer or copolymer. These (co)polymers may be also used as a mixture of two or more of them.

The plasticizer (ii) to be used in the present invention may be any one conventionally used for a polyvinyl chloride plastisol. Examples of the plasticizer include phthalates such as diethyl phthalate, dibutyl phthalate, dioctyl phthalate, dilauryl phthalate and distearyl phthalate; adipates such as dioctyl adipate; sebacates such as dioctyl sebacate; phosphates such as tricresyl phosphate and mixtures of two or more of them. Among them phthalates are preferred and dioctyl phthalate is particularly preferred.

Preferred examples of the epoxy resin (iii-1) to be used as an essential component in the present invention include (I-1) epoxy resins having more than one substituted or unsubstituted glycidyl ether group represented by the formula:

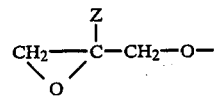

wherein Z is a hydrogen atom or a methyl or ethyl group, on the average in its molecule, (I-2) epoxy resins having more than one substituted or unsubstituted glycidyl ester group represented by the formula:

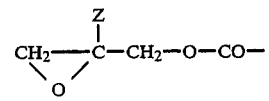

wherein Z is a hydrogen atom or a methyl or ethyl group, on the average in its molecule and (I-3) epoxy resins having more than one substituted or unsubstituted 1,2-epoxypropyl group bonded to a nitrogen atom which is represented by the formula:

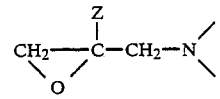

wherein Z is a hydrogen atom or a methyl or ethyl group, on the average in its molecule. It is particularly preferred that the epoxy resin (iii-1) have an epoxy equivalent of 180 to 500.

The epoxy resin (I-1) having more than one substituted or unsubstituted glycidyl ether group in its molecule include those having a glycidyl ether group of a phenolic hydroxyl group and those having a glycidyl ether group of an alcoholic hydroxyl group. Preferred examples of the epoxy resin (I-1) include (I-1-1) polyglycidyl ethers of polyhydric phenols having one or more aromatic nuclei and (I-1-2) polyglycidyl ethers of alcoholic polyhydric compounds prepared by the addition of polyhydric phenols having one or more aromatic nuclei to alkylene oxides having 2 to 4 carbon atoms.

The polyglycidyl ether (I-1-1) includes epoxy resins containing a polyglycidyl ether as a major reaction product which are prepared by reacting (A) a polyhydric phenol having at least one aromatic nucleus with (b) an epihalohydrin in the presence of an effective amount of a basic catalyst such as sodium hydroxide or a basic compound according to an ordinary process, epoxy resins which are prepared by reacting (A) a polyhydric phenol having at least one aromatic nucleus with (b) an epihalohydrin in the presence of a catalytic amount of an acid such as boron trifluoride according to an ordinary process to obtain a polyhalohydrin ether and reacting the polyhalohydrin ether with a basic compound such as sodium hydroxide, and epoxy resins which are prepared by reacting (A) a polyhydric phenol having at least one aromatic nucleus with (b) an epihalohydrin in the presence of a catalytic amount of a basic catalyst such as triethylamine according to an ordinary process to obtain a polyhalohydrin ether and reacting the polyhalohydrin ether with a basic compound such as sodium hydroxide.

The polyglycidyl ether (I-1-2) includes epoxy resins containing polyglycidyl ether as a major reaction product which are, for example, prepared by reacting (B) a polyhydroxyl compound prepared by the addition of a polyhydric phenol having at least one aromatic nucleus with an alkylene oxide having 2 to 4 carbon atoms with (b) an epihalohydrin in the presence of a catalytic amount of an acid catalyst such as boron trifluoride according to an ordinary process to obtain a polyhalohydrin ether and reacting the polyhalohydrin ether with a basic compound such as sodium hydroxide.

The polyhydric phenol (A) having at least one aromatic nucleus include (A-1) mononuclear polyhydric phenols having one aromatic nucleus and (A-2) polynuclear polyhydric phenols having two or more aromatic nuclei.

Examples of the mononuclear polyhydric phenol (A-1) include resorcinol, hydroquinone, pyrocatechol, phloroglucinol, 1,5-dihydroxynaphthalene, 2,7-dihydroxynaphthalene and 2,6-dihydroxynaphthalene.

Examples of the polynuclear polyhydric phenol (A-2) include polynuclear dihydric phenols represented by the general formula:

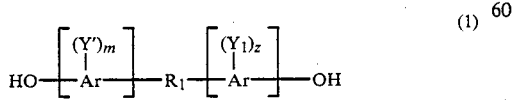
(1)

In the above formula, Ar is an aromatic divalent hydrocarbon group such as a naphthylene or phenylene group and is preferably a phenylene group from the standpoint of the purpose of the present invention; Y' and $Y_1$ may be the same or different from each other and each an alkyl group preferably having at most four carbon atoms such as a methyl, n-propyl, n-butyl, n-hexyl or n-octyl group; a halogen atom such as a chlorine, bromine, iodine or fluorine atom or an alkoxy group preferably having at most four carbon atoms such as a methoxy, methoxymethyl, ethoxy, ethoxyethyl, n-butoxy or amyloxy group. When either or both of the above aromatic divalent hydrocarbon groups have substituents other than the hydroxyl group, the substituents may be the same or different from each other; m and z are each an integer of 0 to a maximum one corresponding to the number of replaceable hydrogen atoms on the aromatic ring (Ar) and may be the same or different from each other. Examples of $R_1$ include

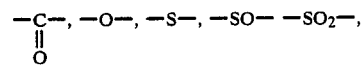

alkylene groups such as methylene, ethylene, trimethylene, tetramethylene, pentamethylene, hexamethylene, 2-ethylhexamethylene, octamethylene, nonamethylene and decamethylene groups; alkylidene groups such as ethylidene, propylidene, isopropylidene, isobutylidene, amylidene, isoamylidene and 1-phenylethylidene groups; alicyclic groups such as 1,4-cyclohexylene, 3,3-cyclohexylene and cyclohexylidene group; halogenated alkylene, alkylidene and alicyclic groups; alkoxy- or aryloxy-substituted alkylidene, alkylene and alicyclic groups such as methoxymethylene, ethoxymethylene, ethoxyethylene, 2-ethoxytrimethylene, 3-ethoxypentamethylene, 1,4-(2-methoxycyclohexane), phenoxyethylene, 2-phenoxytrimethylene, 1,3-(2-phenoxycyclohexane); alkylene groups such as phenylethylene, 2-phenyltrimethylene, 1-phenylpentamethylene and 2-phenyldecamethylene groups; aromatic groups such as phenylene and naphthylene groups, halogenated aromatic groups such as 1,4-(2-chlorophenylene), 1,4-(2-bromophenylene) and 1,4-(2-fluorophenylene) groups; alkoxy- or aryloxy-substituted aromatic groups such as 1,4-(2-methoxyphenylene), 1,4-(2-ethoxyphenylene), 1,4-(2-n-propoxyphenylene) and 1,4-(2-phenoxyphenylene) groups; alkyl-substituted aromatic groups such as 1,4-(2-methylphenylene), 1,4-(2-ethylphenylene), 1,4-(2-n-propylphenylene), 1,4-(2-n-butylphenylene) and 1,4-(2-n-dodecylphenylene) groups. Alternatively, $R_1$ may be a ring fused to one of the above Ar groups like the case of a compound represented by the formula;

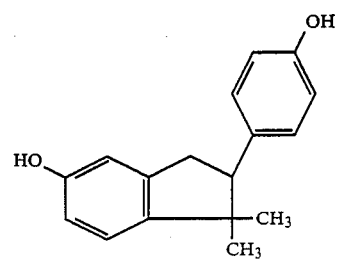

a polyalkoxy group such as a polyethoxy, polypropoxy, polythioethoxy, polybutoxy or polyphenylethoxy group; a silicon-containing group such as a polydimethylsiloxy, polydiphenylsiloxy or polymethylphenylsiloxy group or a group comprising two or more alkylene and/or alkylidene groups which are bonded through an aromatic ring, tert-amino ether bond, carbonyl group, sulfur, or sulfur-containing bond such as sulfoxide.

Preferred examples of the polynuclear dihydric phenol include those represented by the general formula:

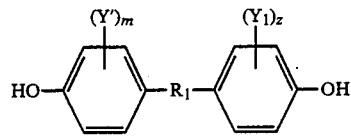
(1-1)

wherein Y' and Y$_1$ are each as defined above; m and z are each a value of 0 to 4 and R$_1$ is an alkylene or alkylidene group preferably having 1 to 3 carbon atoms or a saturated group represented by the formula:

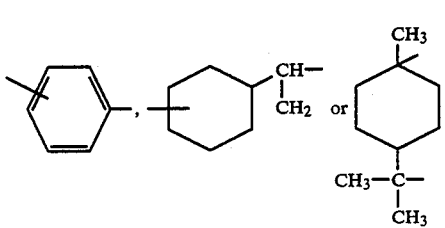

Particular examples of the above dihydric phenol include bis-(hydroxyphenyl)alkanes such as 2,2-bis-(p-hydroxyphenyl)-propane usually called bisphenol A, 2,4'-dihydroxydiphenylmethane, bis-(2-hydroxyphenyl)-methane, bis-(4-hydroxyphenyl)-methane, bis-(4-hydroxy-2,6-dimethyl-3-methoxyphenyl)-methane, 1,1-bis-(4-hydroxyphenyl)-ethane, 1,2-bis-(4-hydroxyphenyl)-ethane, 1,1-bis-(4-hydroxy-2-chlorophenyl)ethane, 1,1-bis-(3,5-dimethyl-4-hydroxyphenyl)-ethane, 1,3-bis-(3-methyl-4-hydroxyphenyl)-propane, 2,2-bis-(3,5-dichloro-4-hydroxyphenyl)-propane, 2,2-bis-(3-phenyl-4-hydroxyphenyl)-propane, 2,2-bis-(3-isopropyl-4-hydroxyphenyl)-propane, 2,2-bis-(2-isopropyl-4-hydroxyphenyl)-propane, 2,2-bis-(4-hydroxynaphthyl)-propane, 2,2-bis-(4-hydroxyphenyl)pentane, 3,3-bis-(4-hydroxyphenyl)-pentane, 2,2-bis(4-hydroxyphenyl)-heptane, bis-(4-hydroxyphenyl)-methane, bis-(4-hydroxyphenyl)-cyclohexylmethane, 1,2-bis-(4-hydroxyphenyl)-1,2-bis-(phenyl)-propane and 2,2-bis-(4-hydroxyphenyl)-1-phenylpropane; dihydroxybiphenyls such as 4,4'-dihydroxybiphenyl, 2,2'-dihydroxybiphenyl and 2,4'-dihydroxybiphenyl; di-(hydroxyphenyl) sulfones such as bis-(4-hydroxyphenyl) sulfone, 2,4'-dihydroxydiphenyl sulfone, chloro-2,4-dihydroxydiphenyl sulfone, 5-chloro-4,4'-dihydroxydiphenyl sulfone and 3'-chloro-4,4'dihydroxydiphenyl sulfone; di-(hydroxyphenyl) ethers such as bis-(4-hydroxyphenyl) ether, 4,3'-(or 4,2'-or 2,2'-dihydroxydiphenyl) ether, 4,4'-dihydroxy-2,6-dimethyldiphenyl ether, bis-(4-hydroxy-3-isobutylphenyl) ether, bis-(4-hydroxy-3-isopropylphenyl) ether, bis-(4-hydroxy-3-chlorophenyl) ether, bis-(4-hydroxy-3-fluorophenyl) ether, bis-(4-hydroxy-3-bromophenyl) ether, bis-(4-hydroxynaphthyl) ether, bis-(4-hydroxy-3-chloronaphthyl) ether, bis-(2hydroxyphenyl) ether, 4,4''-dihydroxy-2,6-dimethoxydiphenyl ether and 4,4'-dihydroxy-2,5-diethoxydiphenyl ether; 1,1-bis-(4-hydroxyphenyl)-2-phenylethane, 1,3,3-trimethyl-1-(4-hydroxyphenyl)-6-hydroxyindan and 2,4-bis-(p-hydroxyphenyl)-4-methylpentane.

Other preferred examples of the polynuclear dihydric phenol include those represented by the general formula:

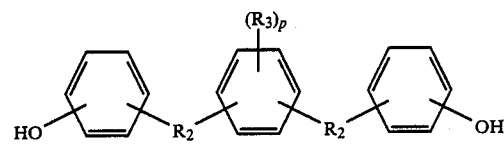
(1-2)

wherein R$_3$ is a methyl or ethyl group; R$_2$ is an alkylidene group having 1 to 9 carbon atoms or other alkylene group and p is 0 to 4.

Examples thereof include 1,4-bis-(4-hydroxybenzyl)-benzene, 1,4-bis-(4-hydroxybenzyl)-tetramethylbenzene, 1,4-bis-(4-hydroxybenzyl)-tetraethylbenzene, 1,4-bis-(p-hydroxycumyl)-benzene and 1,3-bis-(p-hydroxycumyl)-benzene.

Other examples of the polynuclear polyhydric phenol (A-2) include precondensates of phenols with carbonyl compounds (such as phenolic resin precondensates, condensates of phenol with acrolein, condensates of phenol with glyoxal, condensates of phenol with pentanediallyl, condensates of resorcinol with acetone and precondensates of xylene and phenol with formalin) and condensates of phenols with polychloromethylated aromatic compounds (such as condensates of phenol with bischloromethylxylene).

The abovementioned polyhydroxyl compound (B) refers to a compound which is prepared by reacting (A) a polyhydric phenol having at least one aromatic nucleus as described above with an alkylene oxide in the presence of a catalyst for accelerating the reaction between the OH group and the epoxy group and which contains a group of —ROH (wherein R is an alkylene group derived from the alkylene oxide) or —(RO)$_n$H (wherein R is an alkylene group derived from the alkylene oxide and said polyoxyalkylene chain may comprise alkylene groups different from each other and n is the degree of polymerization of the polyoxyalkylene chain and is an integer of 2 or above) which is bonded to the phenol residue through an ether bond. In this preparation, the molar ratio of the alkylene oxide to the polyhydric phenol (A) is at least 1. It is preferred that the equivalent ratio of the OH group of the polyhydric phenol (A) to the alkylene oxide be between 1:1 and 1:10, still preferably between 1:1 and 1:3.

The alkylene oxide includes ethylene oxide, propylene oxide and butylene oxide Particularly, it is preferred that the alkylene oxide be one which can give an ether having a side chain by the etherification thereof with the polyhydric phenol A. Examples of such an alkylene oxide include propylene oxide, 1,2-butylene oxide and 2,3-butylene oxide, among which propylene oxide is particularly preferred.

Preferred examples of the abovementioned polyhydroxyl compound include those represented by the general formula:

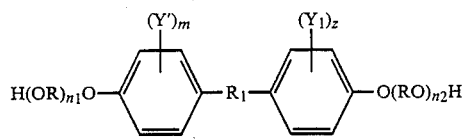

wherein Y', Y$_1$, m, z and R$_1$ are each as defined above with respect to the formula (1-1); R is an alkylene group having 2 to 4 carbon atoms and $n_1$ and $n_2$ are each 1 to 3.

Other preferred examples of the polyhydroxyl compound include those represented by the general formula:

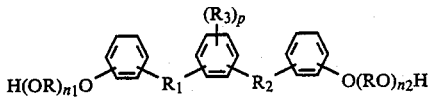

wherein $R_1$, $R_2$ and $R_3$ are each as defined above with respect to the formula (1-2); R is an alkylene group having 2 to 4 carbon atoms and $n_1$ and $n_2$ are each 1 to 3.

The epihalohydrin (b) includes compounds represented by the general formula:

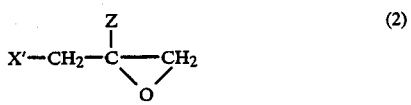

wherein Z is a hydrogen atom or a methyl or ethyl group and X' is a halogen atom, and examples thereof include epichlorohydrin, epibromohydrin, 1,2-epoxy-2-methyl-3-chloropropane and 1,2-epoxy-2-ethyl-3-chloropropane.

The acid catalyst to be used in order to accelerate the reaction of the epihalophydrin (b) with the polyhydric phenol (A) or the epihalohydrin (B) includes Lewis acids such as boron trifluoride, stannic chloride, zinc chloride and ferric chloride, active derivative thereof (such as boron trifluoride-ether complexes) and mixtures thereof.

The basic catalyst to be used in order to accelerate the reaction of the epihalohydrin (b) with the polyhydric phenol (A) includes alkali metal hydroxides (such as sodium hydroxide), alkali metal alcoholates (such as sodium ethylate), tertiary amines (such as triethylamine and triethanolamine), quaternary ammonium compounds (such as tetramethyl ammonium bromide) and mixtures thereof. The above reaction may be carried out so as to simultaneously give a glycidyl ether. Alternatively, the halohydrin ether obtained by the reaction may be dehydrohalogenated in the presence of a basic compound to carry out ring closure, thus giving a glycidyl ether. Suitable examples of the basic compound include alkali metal hydroxides (such as sodium hydroxide) and alkali metal aluminates (such as sodium aluminate).

Of course, the catalysts and basic compounds may be used as such or as a solution thereof in a suitable organic or inorganic solvent.

The epoxy resin (I-2) having more than one substituted or unsubstituted glycidyl ester groups on an average in its molecule includes polyglycidyl esters of aliphatic or aromatic polycarboxylic acids such as epoxy resins obtained by the polymerization of the glycidyl methacrylate which is prepared by the reaction of the epihalohydrin (b) of the general formula (2) with methacrylic acid.

Examples of the epoxy resin (I-3) having more than one substituted or unsubstituted 1,2-epoxypropyl group bonded to a nitrogen atom on an average in its molecule include epoxy resins prepared by the reaction between aromatic amines (such as aniline or aniline substituted with alkyl group(s) on its nucleus) and epihalohydrin (b) of the general formula (2), epoxy resins prepared by reacting precondensates of aromatic amines with formaldehyde (such as aniline-formaldehyde or aniline-phenolformaldehyde precondensate) with epihalohydrin (b), hydantoin diglycidyl ether and triglycidyl isocyanurate.

The epoxy resin further includes linear aliphatic epoxy resins such as epoxidized polybutadiene; epoxidized vegetable oils such as epoxidized linseed oil and epoxidized soybean oil and alicyclic epoxy resins such as 3,4-epoxy-6-methylcyclohexylmethyl 3,4-epoxy-6-methylcyclohexanecarboxylate, bis(3,4-epoxy-6-methylcyclohexylmethyl) adipate, vinylcyclohexene diepoxide and bis-(2,3-epoxycyclopentyl) ether. These compounds may be used alone or as a mixture of two or more of them.

Furthermore, other known epoxy resins containing adjacent epoxy groups such as various resins disclosed in "Epoxy Resins and Preparation and Application thereof" (edited by Hiroshi Kakiuchi) may be used.

The unsaturated aliphatic acid (iii-2) to be used in order to prepare a modified epoxy resin (iii-3) having both unsaturated and hydroxyl groups may be a fatty acid having at least one unsaturated double bond in its molecule, for example, oleic acid. It is preferable to use an unsaturated fatty acid having at least 6 carbon atoms, still preferably at least 14 carbon atoms Representative examples thereof include unsaturated fatty acids derived from drying or semidrying oils.

Preferred examples of the unsaturated aliphatic acid (iii-2) include those derived from dehydrated castor oil, linseed oil, soybean oil, tall oil or safflower oil and synthetic drying oil fatty acids (e.g., "HIDIENE", a product of Soken Chemical Engineering Co., Ltd.). These acids may be used alone or as a mixture of two or more of them.

Other preferred examples of the unsaturated aliphatic acid include unsaturated monobasic acids such as acrylic, methacrylic, crotonic, cinnamic or itaconic acid and mixtures thereof with unsaturated polybasic acids such as maleic or fumaric acid.

The reaction of preparing the modified epoxy resin (iii) containing both unsaturated and hydroxyl groups may be carried out by a conventional process for reacting an epoxy group with a carboxyl group. The reaction temperature is 70° to 150° C., preferably 90° to 130° C.

For the purpose of accelerating the reaction, it is advantageous to use a known polymerization catalyst such as tertiary amine, quaternary ammonium salt or Lewis acid salt.

The molar ratio of the epoxy resin (iii-1) to the unsaturated aliphatic acid (iii-2) is generally between 1:0.1 and 1:0.9, preferably between 1:0.3 and 1:0.6.

If necessary, a conventional polymerization inhibitor may be used and examples of the polymerization inhibitor include hydroquinone, methylhydroquinone, monomethyl ether hydroquinone, benzoquinone, amines and copper salts.

The isocyanate compound to be used for preparing the blocked isocyanate (iv) according to the present invention include polyisocyanates, polyisocyanate polymers, mixtures of the both, urethane prepolymer of polyisocyanates or polyisocyanate polymers and mixtures of two or more of them.

Examples of the polyisocyanate include diisocyanates represented by the general formula:

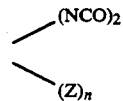

where is a benzene or naphthalene ring;
—NCO is a nuclear substituent isocyanate group; Z is a nuclear substituent halogen atom or alkyl or alkoxyl group having at most 3 carbon atoms and n is 0, 1 or 2, such as 2,4-toluylene diisocyanate, 2,6-toluylene diisocyanate, 1,4-naphthylene diisocyanate, 1,5naphthylene diisocyanate, 1,3-phenylene diisocyanate, 1,4-phenylene diisocyanate and 1-isopropylbenzene 2,4-diisocyanate; diisocyanates represented by the general formula:

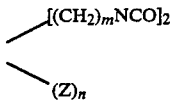

wherein is a benzene or naphthalene ring; $-(CH_2)_mNCO$ is a nuclear substituent alkylene isocyanate group; Z is a nuclear substituent halogen atom or alkyl or alkoxy group having at most 3 carbon atoms; m is 1 or 2 and n is 1 or 2, such as $\omega,\omega'$-diisocyanate-1,2-dimethylbenzene, $\omega,\omega'$-diisocyanate-1,3-dimethylbenzene; diisocyanates represented by the general formula:

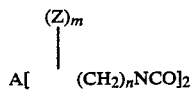

wherein A is an alkylene group having at least 3 carbon atoms (such as

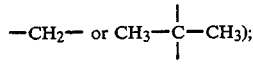

° is a benzene or naphthalene ring; Z is a nuclear substituent halogen atom or alkyl or alkoxy group having at most 3 carbon atoms and n is 0, 1 or 2, such as 4,4'-diphenylmethane diisocyanate, 2,2'-dimethyldiphenylmethane 4,4'-diisocyanate, diphenyldimethylmethane 4,4'-diioscyanate and 3,3'-dichlorodiphenyldimethylmethane 4,4'-diisocyanate; diisocyanates represented by the general formula:

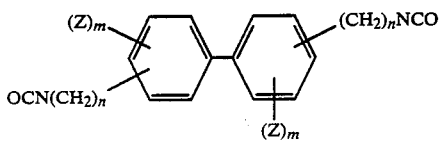

wherein Z is a nuclear substituent halogen atom or alkyl or alkoxy group having at most 3 carbon atoms; m is 0 or 1 and n is 0, 1 or 2, such as biphenyl 2,4'-diiocyanate, biphenyl 4,4'-diisocyanate, 3,3'-dimethylbiphenyl 4,4'-diisocyanate and 3,3'-dimethoxybiphenyl 4,4'-diisocyanate; diphenyl sulfone 4,4'-diisocyanate; diisocyanates obtained by hydrogenating the aromatic rings of the above isocyanates (such as dicyclohexane 4,4'-diisocyanate, $\omega,\omega'$-diisocyanate-1,2-dimethylbenzene and $\omega,\omega'$-diisocyanate-1,3-dimethylbenzene; diisocyanates having a substituted urea group which are prepared by the reaction of 2 mol of diisocyanate with 1 mol of water (such as urea diisocyanate prepared by the reaction of 2 mol of 2,4-toluylene diisocyanate with 1 mol of water); urete dione diisocyanates prepared by the conventional dimerization of aromatic diisocyanates; propane 1,2-diisocyanate, 2,3-dimethylbutane 2,3-diisocyanate, 2-methylpentane 2,4-diisocyanate, octane 3,6-diisocyanate, 3,3-dinitropentane 1,5-diisocyanate, octane 1,6-diisocyanate and hexamethylene diisocyanate, among which aromatic polyisocyanates such as tolylene diisocyanate and diphenylmethane diisocyanate are particularly preferred.

The polyisocyanate polymer according to the present invention can be prepared by polymerizing a polyisocyanate as described above, preferably tolylene diisocyanate, diphenylmethane diisocyanate or hexamethylene diisocyanate, in an inert solvent such as methyl acetate, ethyl acetate, butyl acetate, methyl ethyl ketone or dioxane or in a plasticizer in the presence of an ordinary catalyst such as tertiary amine, Mannich base, alkali metal salt of fatty acid or alcoholate according to a conventional method. Examples of the plasticizer to be used include phthalates such as diethyl phthalate, dibutyl phthalate, di-2-ethylhexyl phthalate, mixed alkyl phthalates wherein the alkyl groups each have 7 to 11 carbon atoms (hereinafter abbreviated to "$C_{7\sim11}$ alkyl"), butyl benzyl phthalate and hexanolbenzyl phthalate; phosphates such as triscresyl phosphate and trisphenyl phosphate; adipates such as di-2-ethylhexyl adipate and trimellitates such as mixed $C_{7\sim11}$ alkyl trimellitates. When the polymerization is carried out in a highly volatile solvent, it is preferable to finally replace the volatile solvent with a suitable high-boiling solvent such as a plasticizer. It is preferable to carry out the polymerization of polyisocyanate in a phthalate plasticizer, still preferably, dialkyl phthalate or alkyl benzyl phthalate, wherein the alkyl has at least 7 carbon atoms.

The urethane prepolymer according to the present invention can be prepared by reacting a polyhydroxyl compound such as polyether polyol, polyester polyol or a mixture thereof with an excess of an aromatic polyisocyanate, polyisocyanate polymer or a mixture thereof as described above according to an ordinary process for preparing an NCO-containing urethane prepolymer.

Preferred examples of the polyether polyol include compounds represented by the general formula:

$$R[(OR_1)_nOH]_p$$

wherein R is a polyhydric alcohol residue; $(OR_1)_n$ is a polyoxyalkylene chain comprising an oxyalkylene group having 2 to 4 carbon atoms; n is the degree of polymerization of the polyoxyalkylene chain and is a number corresponding to a molecular weight of 100 to 4500 and p is preferably 2 to 4.

Preferred examples of the polyhydric alcohol corresponding to the polyhydric alcohol residue in the above formula include aliphatic dihydric alcohols such as ethylene glycol, propylene glycol, 1,4-butylene glycol and neopentane glycol; trihydric alcohols such as glycerin, trihydroxyisobutane, 1,2,3-butanetriol, 1,2,3-pentanetriol, 2-methyl-1,2,3-propanetriol, 2-methyl-2,3,4-butanetriol, 2-ethyl-1,2,3-butanetriol, 2,3,4-pentanetriol, 2,3,4-hexanetriol, 4-propyl-3,4,5-heptanetriol, 2,4-dimethyl-2,3,4-pentanetriol, pentamethylglycerin, pentaglycerin, 1,2,4-butanetriol, 1,2,4-pentanetriol and trimethylolpropane; tetrahydric alcohols such as erythritol, pentaerythritol, 1,2,3,4-pentanetetrol, 2,3,4,5-hexanetetrol, 1,2,3,5-pentanetetrol and 1,3,4,5-hexanetetrol and pentahydric alcohols such as adonitol, arabitol and xylitol and hexahydric alcohols such as sorbitol, mannitol and iditol.

Among the polyhydric alcohols described above, alcohols having 2 to 4 hydroxyl groups are preferred and propylene glycol and glycerin are particularly preferred.

The polyether polyol of the above general formula can be prepared by reacting a polyhydric alcohol as described above with an alkylene oxide having 2 to 4 carbon atoms according to an ordinary process in such a way as to give an adduct having a desired molecular weight.

Examples of the alkylene oxide having 2 to 4 carbon atoms include ethylene oxide, propylene oxide and butylene oxide, among which propylene oxide is particularly preferred.

The above polyester polyol includes ordinary polyesters prepared from polycarboxylic acids and polyhydric alcohols and polyesters prepared from lactams.

Examples of the polycarboxylic acid include benzenetricarboxylic, adipic, succinic, suberic, sebacic, oxalic, methyladipic, glutaric, pimelic, azelaic, phthalic, terephthalic, isophthalic, thiodipropionic, maleic, fumaric, citraconic, itaconic and other suitable carboxylic acids.

Examples of the polyhydric alcohol include ethylene glycol, propylene glycol, 1,4-butanediol, 1,3-butanediol, 1,5-pentanediol, 1,6-hexanediol, bis(hydroxymethylchlorohexane), diethylene glycol, 2,2-dimethylpropylene glycol, 1,3,6-hexanetriol, trimethylolpropane, pentaerythritol, sorbitol, glycerin and other suitable polyhydric alcohols.

Further, polytetramethylene glycol and polycaprolactone glycol may be used as the polyhydroxyl compound.

The urethane prepolymer according to the present invention can be prepared by reacting a polyhydroxyl compound as described above, for example, polyether polyol, polyester polyol, mixture of them or mixture thereof with OH-containing glyceride such as castor oil with a polyisocyanate, polyisocyanate polymer or mixture of them.

In the preparation of the urethane prepolymer according to the present invention, the molar ratio of the aromatic polyisocyanate, aromatic polyisocyanate polymer or mixtures of them to the polyhydroxyl compound is between 1.5:1 and 3.5:1, preferably between 2.0:1 and 3.0:1.

The NCO content (percentage) of the prepolymer is generally 1 to 20%, preferably 2 to 15%.

The urethane prepolymer can be prepared by a conventional process. The reaction is generally carried out at a temperature of 40° to 110° C., preferably 50° to 100° C. In the preparation of the urethane prepolymer, a conventional catalyst for the preparation of urethane may be used. Examples of the catalyst include organometallic compounds such as dibutyltin dilaurate, stannous octoate, stannous octoate, lead octoate, lead naphthenate and zinc octoate and tertiary amines such as triethylenediamine and triethylamine.

The blocking agent to be used in the preparation of the blocked isocyanate (iv) include phenols, for example, phenol, alkylphenols such as cresol (m-, o- or p-cresol or mixture of them), xylenol, octylphenol, nonylphenol, dinonylphenol, p-t-butylphenol and sec-butylphenol, styrenated phenols and hydroxybenzoates.

The hydroxybenzoate includes o-hydroxybenzoates, m-hydroxybenzoates and p-hydroxybenzoates, among which p-hydroxybenzoates are particularly preferred.

With respect to the m- and p-hydroxybenzoates, the other group constituting the hydroxybenzoate include long-chain alkyl groups such as n-heptyl, n-octyl, 2-ethylhexyl, nonyl and dodecyl groups; alkoxyalkyl groups having long-chain polyoxyethylene or polyoxypropylene group bonded thereto and alkoxyalkyl groups comprising a long-chain alkyl group and an oxyethylene or oxypropylene group bonded thereto. On the other hand, with respect to the o-hydroxybenzoates, the group includes alkyl groups such as methyl, ethyl, isopropyl, isoamyl, n-butyl, isobutyl, sec-butyl, n-heptyl, n-octyl, 2-ethylhexyl, nonyl and dodecyl groups; alkoxyalkyl groups bonded to (poly)oxyethylene or (.poly)oxypropylene group and aryl groups such as phenyl and benzyl groups.

The blocking, in preparing the blocked isocyanate (iv), is carried out by a conventional process. The amount of the blocking agent used is generally 1 to 2 times by equivalent, preferably 1.05 to 1.5 times by equivalent, as much as the free isocyanate group.

The blocking of an aromatic polyisocyanate or polymer thereof may be generally carried out by adding a blocking agent in the final reaction step.

The blocking of a urethane prepolymer may be carried out by adding a blocking agent in an arbitrary step to carry out the blocking reaction.

The addition of a blocking agent may be carried out just after the completion of the polymerization or in the initial stage of the polymerization. Alternatively, a part of a blocking agent may be added in the initial stage of the polymerization and the residual part thereof may be added just after the completion of the polymerization. It is preferred to add it just after the completion of the polymerization. In this case, the completion of the polymerization may be judged based on the isocyanate content (%) (as determined by, for example, a process described in "Polyurethane" published by Maki Shoten, p. 21, 1960). The blocking reaction may be generally carried out at 50° to 150° C., preferably 60° to 120° C., for about 1 to 7 hours. A conventional catalyst for the polymerization of urethane as mentioned above may be used to thereby accelerate the reaction. Further, the plasticizer according to the present invention may be added in an arbitrary amount.

The blocked isocyanate (iv) may be one or more members selected from among the abovementioned blocked aromatic polyisocyanate compounds, blocked aromatic polyisocyanate polymers and blocked urethane prepolymers.

The latent curing agent (v) for an epoxy resin according to the present invention includes dicyandiamide (DICY), melamine, diallylmelamine, benzoguanamine, acetoguanamine, imidazoles such as "CUREZOLE 2MZ, 2EZ, 2E4MZ, 21Z, $C_{11}Z$, $C_{17}Z$, 2PZ, 2P4MZ. 1B2MZ, 2MZ-CN, 2E4MZ-CN, 21Z-CN, $C_{11}Z$-CN, 2PZ-CN, 2MZ-CNS, 2E4MZ-CNS, $C_{11}Z$-CNS, 2PZ-CNS, 2MZ-AZINE, 2E4MZ-AZINE" (products of Shikoku Chemical Corporation); imidazole-metal salt complexes such as "CUREZOLE" 2MA-OK (a product of Shikoku Chemical Corporation); benzimidazole, benzotriazole, biguanides such as 1-o-toluylbiguanide, amide imides of phthalic acid or phthalic anhydride with diethylenetriamine; amine salts and tert-aminecontaining modified compounds of ethylenediamine, hexamethylenediamine, diethylaminopropylamine, dimethylamine or propylamine with bisphenol A, bisphenol F, phenolic resin or tetrabromobisphenol A; alkylureas such as 3-(p-chlorophenyl)-1,1-dimethylurea, 3-(3,4-dichlorophenyl)-1,1-dimethylurea, dimethylurea, tetramethylurea and tetramethylthiourea; boron trifluoride-amine salts such as $BF_3$-monoethylamine, $BF_3$-aniline and $BF_3$-dimethylaniline; imidazolines such as 2-methylimidazoline, 2-ethylimidazoline, 2-n-butylimidazoline, 2-(4'-sulfamidobenzyl)imidazoline, 2-dodecylimidazoline, 2-tetradecylimidazoline, 2-benzylimidazoline, 2-(3'-phenylpropyl)imidazoline, 2-(3'-cyclohexylpropyl)imidazoline, 2'(4'-aminobenzyl)imidazoline, 2-sulfamidomethylimidazoline, 2,2'-bisimidazoline, 2,2'-ethylenediimidazoline, 1,3-bis(2'-imidazolinyl)-propane, 1,4-bis(2'-imidazolinyl)butane, 1,5-bis-(2'-imidazolinyl)pentane, 2,4-dimethylimidazoline, 2-ethyl-4-methylimidazoline, 1,8-bis(2'-imdaizolinyl)-octane, 1,11-bis(2'-imidazolinyl)undecane, 2-phenylimidazoline, 2-(4'-chlorophenyl)imidazoline, 2-(p-anisyl)imidazoline, 2-(3',4'-dimethoxyphenyl)imidazoline, 2-(2'-nitrophenyl)imidazoline, 2-(4'-sulfophenyl)imidazoline, 2-(4'-sulfonamidophenyl)-imidazoline, 2-(4'-methylsulfonylphenyl)imidazoline, 2-α-naphthylimidazoline, 2-β-naphthylimidazoline, 2-(p-methylphenyl)imidazoline, 1,3-bis(2'-imidazolinyl)-benzene, 1,4-bis(2'-imidazolinyl)benzene, 4,4'-bis-(2'-imidazolinyl)diphenyl, 4,4'-bis(2'-imidazolinyl)-stilbene, 2-phenyl-4-methylimidazoline, 1,4-bis[4-methylimidazolinyl-(2)]benzene, 2-α-pyridylimidazoline, 2-β-pyridylimidazoline and salts thereof.

Alternatively, the latent curing agent (v) may be a carboxylic acid dihydrazide and examples thereof include adipodihydrazide, sebacodihydrazide, isophthalodihydrazide, 1,3-bis-(hydrazinocarboethyl)-5-isopropylhydantoin

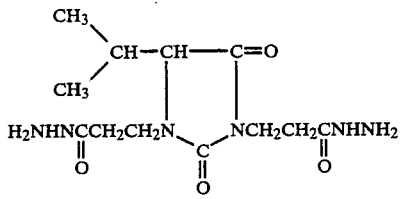

eicosanodihydrazide

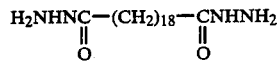

hydroquinone diglycolodihydrazide, resorcinol diglycolodihydrazide, 4,4'-ethylidenebisphenol diglycolodihydrazide and

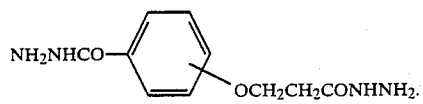

These curing agents may be used alone or as a mixture of two or more of them.

According to the present invention, the weight ratio of the modified epoxy resin (iii) to the blocked isocyanate (iv) to be used as the tackifier is generally between 95:5 and 5:95, preferably between 10:90 and 90:10.

The plastisol composition of the present invention may contain other various additives such as filler or stabilizer in addition to the above components (i) through (v). Examples of the filler include inorganic ones such as calcium carbonate, talc, diatomaceous earth and kaolin and organic ones such as cellulose powder, rubber powder and reclaimed rubber. Examples of the stabilizer include metal soaps such as calcium stearate and aluminum stearate; salts of inorganic acids such as dibasic phosphites and dibasic sulfates and organometallic compounds such as dibutyltin dilaurate and dibutyltin maleate. Further, the composition may also contain a coloring agent such as pigment.

Although the contents of the components in the polyvinyl chloride plastisol composition are not particularly limited, they are, for example, as follows:

|  | general range | preferred range |
|---|---|---|
| (i) | 10 to 50% by weight | (20 to 40% by weight) |
| (ii) | 10 to 50% by weight | (20 to 40% by weight) |
| (iii) + (iv) | 0.1 to 30% by weight | (0.5 to 15% by weight) |
| filler | 0 to 70% by weight | (10 to 60% by weight) |
| stabilizer | 0 to 3% by weight | (0.1 to 2% by weight) |

When a latent curing agent (v) for an epoxy resin is added, the amount thereof is 0.3 to 50 parts by weight, preferably 0.5 to 30 parts by weight, per 100 parts by weight of the total amount of the components (iii) and (iv).

If the total amount of the tackifiers (iii) and (iv) is less than 0.1% by weight, no effect will be attained, while if it exceeds 30% by weight, the resulting plastisol will unfavorably give too hard a cured product. If the amount of the latent curing agent (v) for epoxy resin is less than 0.3 part by weight per 100 parts by weight of the total amount of the modified epoxy resin (iii) and the blocked isocyanate (iv), no effect will be attained, while if it exceeds 50 parts by weight, the resulting plastisol will unfavorably become too thick.

The polyvinyl chloride plastisol composition of the present invention can be prepared by conventional kneading.

The composition of the present invention is applicable to the surface of various metals and various undercoats of metals and is also applicable to the surface of a cationic electro-deposit. The cationic electro-deposit to be coated with the composition of the present invention is, for example, one formed by neutralizing an adduct of an epoxy resin with a primary or secondary amine with an acid to water-solubilize the adduct and depositing a mixture of the solubilized adduct and a blocked isocyanate on the surface of the cathodic metal by applying direct current.

The coating weight of the polyvinyl chloride plastisol composition according to the present invention is generally 1000 to 5000 g/body and coating thickness thereof is generally 0.3 to 2 mm. After the application, the plastisol composition is cured by heating at 120° to 200° C. for 20 to 40 minutes. The application may be carried out by a conventional method, for example, a process of feeding the composition with a compressive pump and ejecting it with a blow gun or airless spray.

The polyvinyl chloride plastisol composition comprising the essential components defined in this specification is remarkably improved in the adhesion to the surface of metals as compared with the plastisol composition of the prior art comprising a polyvinyl chloride plastisol and an epoxy or acrylic resin, is improved in adhesion and resistance to color deterioration caused by high-temperature treatment as compared with the composition comprising a polyvinyl chloride plastisol, an epoxy resin and a blocked isocyanate, is remarkably improved in storage stability and resistance to color deterioration caused by high-temperature treatment as compared with the composition comprising a polyvinyl chloride plastisol and a polyamide resin or a blocked isocyanate and is remarkably improved in adhesion attained by relatively low-temperature treatment to an oil-treated steel sheet as compared with the plastisol composition containing the tackifier of the prior art.

As described above, the polyvinyl chloride plastisol composition of the present invention can strongly adhere to the surface of various metals or various undercoats (such as cationic electro-deposit) of metals by baking at a temperature of 120° to 200° C. for 30 minutes or shorter, does not cause blowing, is excellent in adhesion even after the immersion in hot water or heating, causes neither discoloration nor color deterioration even by high-temperature treatment and is excellent in storage stability. Therefore, the plastisol composition of the present invention is useful as a body sealer or undercoat for an automotive body.

Now, the effects of the present invention will be illustrated in more detail by referring to the following Examples and Comparative Examples, though they do not limit the invention at all.

Preparation of modified epoxy resin (iii) containing both unsaturated and hydroxyl groups Referential Example 1-1

380 g of "ADEKA RESIN EP-4100"*1 and 284 g of "HIDZENE"*2 were fed into a four-necked flask fitted with a stirrer, a thermometer, a cooling tube and a nitrogen gas inlet tube, followed by mixing and heating. 0.5 g of diethylamine hydrochloride was added to the flask at 50° C. The resulting mixture was heated to carry out the reaction at 110° C. for 5 hours. A modified epoxy resin 1 containing both unsaturated and hydroxyl groups and having an acid value of 0 and an epoxy equivalent of 664 was obtained. 6*1 "ADEKA RESIN EP-4100": epoxy resin of bisphenol A type (epoxy equivalent: 190) mfd. by Asahi Denka Kogyo, K.K. 6*2 "HIDIENE: highly conjugated linoleic acid (neutralization value: 198, iodine number: 167, conjugated diene (%): 51) mfd. by Soken Chemical Engineering Co., Ltd.

Referential Example 1-2

190 g of "EP-4100", 145 g of tall oil fatty acid and 0.4 g of triethanolamine were fed into a four-necked flask fitted with a stirrer, a thermometer, a cooling tube and a nitrogen gas inlet tube, followed by mixing. The reaction was carried out in a similar manner to the one described in Referential Example 1-1 to obtain a modified epoxy resin 2 containing both unsaturated and hydroxyl groups and having an epoxy equivalent of 670.

Referential, Example 1-3

| "EPIKOTE 1001"* | 450 parts by weight |
| diethylamine hydrochloride | 0.1 part by weight |
| "HIDIENE" | 142 parts by weight |
| dioctyl phthalate | 450 parts by weight |

The above components were fed into a four-necked flask fitted with a stirrer, a thermometer, a cooling tube and a nitrogen gas inlet tube to carry out the reaction in a similar manner to the one described in Referential Example 1-1. Thus, a modified epoxy resin 3 containing both unsaturated and hydroxyl groups and having an epoxy equivalent of 2080 was obtained.

Preparation of blocked isocyanate (iv)

Referential Example 1-4

| toluylene diisocyanate* | 174 parts by weight |
| dioctyl phthalate | 674 parts by weight |
| 2-ethylhexyl p-hydroxybenzoate | 550 parts by weight |
| dibutyltin dilaurate | 0.01 part by weight |

The above components were fed into a four-necked flask fitted with a stirrer, a thermometer and a nitrogen gas inlet tube to carry out the reaction at 80° C. for 5 hours, while introducing nitrogen gas into the flask. Thus, a blocked isocyanate 1 having all of the NCO groups blocked completely was obtained.

Referential Example 1-5

| "CORNATE 2030"* | 100 parts by weight |
| dioctyl phthalate | 200 parts by weight |
| nonylphenol | 50 parts by weight |
| dibutyltin dilaurate | 0.05 part by weight |

The above components were fed into a four-necked flask fitted with a stirrer, a thermometer and a nitrogen gas inlet tube to carry out the reaction in a similar manner to the one described in Referential Example 1-4. The butyl acetate which is the solvent of "CORONATE 2030",was removed under a reduced pressure to obtain a blocked isocyanate 2.

Referential Example 1-6

| "ADEKA NEW ACE F1212-5"* | 500 parts by weight |
| diphenylmethane diisocyanate | 500 parts by weight |
| dioctyl phthalate | 1495 parts by weight |

The above components were fed into a four-necked flask fitted with a stirrer, a thermometer and a nitrogen gas inlet tube to carry out the reaction at 60° C. for 3 hours, followed by the addition of 495 parts by weight of nonylphenol. The reaction was carried out at 80° C. for 5 hours to obtain a blocked isocyanate 3 having all of the NCO groups blocked completely.

Examples 1-1 to 1-7

A mixture comprising 60 parts (by weight, the same applies hereinafter) of a polyvinyl chloride powder (a) ("ZEON 121"; a product of The Japanese Zeon Co.), 20 parts of a polyvinyl chloride powder (b) ("ZEON 1032 X"; a product of The Japanese Zeon Co.), 100 parts of dioctyl phthalate (DOP), 80 parts of calcium carbonate (a) ("HAKUENKA" CC mfd. by Shiraishi Calcium), calcium carbonate (b) ("WHITEN" SB mfd. by Shiraishi Calcium), 3 parts of titanium oxide (37 KR-380" mfd. by Titan Kogyo K.K.), 1.5 parts of an age resistor, 0.5 part of a -fluidity adjustor and the modified epoxy resin (iii) containing both unsaturated and hydroxyl groups and blocked isocyanate given in Table 1-1 was kneaded and deaerated in a vacuum to obtain a polyvinyl chloride plastisol composition.

This composition was applied to a mild steel sheet and caused to gel to determine the adhesion, flexibility and discoloration of the obtained coating. Further, the composition was also examined for storage stability at 40° C. The results are shown in Table 1-1.

Comparative Examples 1-1 to 1-3

Polyvinyl chloride plastisol compositions which are different from those of Examples 1-1 to 1-7 only in respect of containing a tackifier other than those defined in the present invention were prepared and examined. The results are shown in Table 1-1.

(7) Adhesion after the storage at 40° C. for 3 days

The polyvinyl chloride plastisol was stored at 40° C. for 3 days to determine the adhesion to a mild steel sheet.

The compositions of Comparative Examples 1-1 to 1-3 were all inferior to those of Examples 1-1 to 1-7 in adhesion or discoloration. The polyvinyl chloride plastisol compositions of the present invention are remarkably improved in adhesive strength, flexibility, discoloration resistance and storage stability at 40° C. Examples 1-8 to 1-14

A mixture comprising 80 parts of a vinyl chloride copolymer powder (c) ("ZEON 135 J" mfd. by The

TABLE 1-1

| | Example | | | | | | | Comp. Example | | |
|---|---|---|---|---|---|---|---|---|---|---|
| | 1-1 | 1-2 | 1-3 | 1-4 | 1-5 | 1-6 | 1-7 | 1-1 | 1-2 | 1-3 |
| Composition (parts by weight) | | | | | | | | | | |
| polyvinyl chloride powder (a) | 60 | ← | ← | ← | ← | ← | ← | 60 | ← | ← |
| polyvinyl chloride powder (b) | 20 | ← | ← | ← | ← | ← | ← | 20 | ← | ← |
| DOP | 100 | ← | ← | ← | ← | ← | ← | 100 | ← | ← |
| calcium carbonate (a) | 80 | ← | ← | ← | ← | ← | ← | 80 | ← | ← |
| calcium carbonate (b) | 20 | ← | ← | ← | ← | ← | ← | 20 | ← | ← |
| titanium oxide | 3 | ← | ← | ← | ← | ← | ← | 3 | ← | ← |
| age resistor | 1.5 | ← | ← | ← | ← | ← | ← | 1.5 | ← | ← |
| fluidity adjustor | 0.5 | ← | ← | ← | ← | ← | ← | 0.5 | ← | ← |
| modified epoxy resin containing hydroxyl and unsaturated groups 1 | 10 | 10 | 10 | 10 | 10 | — | — | — | — | — |
| modified epoxy resin containing hydroxyl and unsaturated groups 2 | — | — | — | — | — | 10 | — | — | — | — |
| modified epoxy resin containing hydroxyl and unsaturated groups 3 | — | — | — | — | — | — | 10 | — | — | — |
| blocked isocyanate 1 | 5 | — | — | 5 | — | — | — | — | — | — |
| blocked isocyanate 2 | — | 10 | — | 5 | 5 | 10 | 10 | — | 10 | 10 |
| blocked isocyanate 3 | — | — | 10 | — | 5 | — | — | — | — | — |
| "ADEKA RESIN EP-4100"*1 | — | — | — | — | — | — | — | 10 | 10 | — |
| Adhesion (180° C. × 20 min) | | | | | | | | | | |
| ordinary state | | | | | | | | x | Δ | Δ |
| resistance to hot water*2 | Δ | | | | | Δ | | x | Δ | x |
| resistance to heat*3 | Δ | | | | | | | x | Δ | x |
| Flexibility (180° C. × 20 min) | | | | | | | | x | x | x |
| Discoloration (180° C. × 20 min) | | | | | | | | x | x | x |
| Adhesion after storage of 40° C. × 3 days (180° C. × 20 min) | | | | | | | | x | x | x |

(Notes)
*1epoxy resin of bisphenol A type mfd. by Asahi Denka Kogyo K. K.
*2adhesion after the immersion in hot water at 40° C. for 7 days
*3adhesion after the heating at 102° C. for 3 days Test methods of the characteristics shown in Table 1-1

(1) Substrate: mild steel sheet
(2) Application: applied with a spacer in a thickness of 2 mm
(3) Baking: 180° C.×20 minutes
(4) Evaluation of adhesion:

Peeling with nail
- complete CF: cohesive failure of plastisol
- complete AF: adhesive failure   x
- AF/CF: partial cohesive and adhesive failure   Δ

(5) Evaluation of flexibility
- bending at 180°   no crack
- bending at 180°   crack   x (6) Evaluation of discoloration
- the surface is white
- the surface is from white to creamy
- the surface is brown   x Japanese Zeon Co.), 100 parts of DOP, 50 parts of calcium carbonate (a), 50 parts of calcium carbonate (b), 3 parts of titanium oxide, 1.5 parts of an age resistor, 0.5 part of a fluidity adjustor and the modified epoxy resin (iii), blocked isocyanate (iv) and latent curing agent (v) given in Table 2 was kneaded and deaerated in a vacuum to obtain a polyvinyl chloride plastisol composition. This composition was examined for adhesion to a cationically electrocoated plate, flexibility, discoloration and adhesion to an oil-treated steel sheet. The results are shown in Table 1-2.

Comparative Example 1-4

The same procedure as the one described in Examples 1-8 to 1-14 was repeated except that 2 parts of "ACR HARDENER H-270" (polyamide of polymerized fatty acid, amine value: 300) was used as a tackifier.
The results are shown in Table 1-2.

TABLE 1-2

| | Example | | | | | | | Comp. Example |
|---|---|---|---|---|---|---|---|---|
| | 1-8 | 1-9 | 1-10 | 1-11 | 1-12 | 1-13 | 1-14 | 1-4 |
| Composition (parts by weight) | | | | | | | | |
| vinyl chloride copolymer powder (c) | 80 | ← | ← | ← | ← | ← | ← | 80 |
| DOP | 100 | ← | ← | ← | ← | ← | ← | 100 |
| calcium carbonate (a) | 50 | ← | ← | ← | ← | ← | ← | 50 |
| calcium carbonate (b) | 50 | ← | ← | ← | ← | ← | ← | 50 |
| titanium oxide | 3 | ← | ← | ← | ← | ← | ← | 3 |
| age resistor | 1.5 | ← | ← | ← | ← | ← | ← | 1.5 |
| fluidity adjustor | 0.5 | ← | ← | ← | ← | ← | ← | 0.5 |
| modified epoxy resin containing hydroxyl and unsaturated groups 1 | 10 | 10 | 10 | 10 | 10 | 10 | 10 | — |
| blocked isocyanate 2 | 10 | 10 | 10 | 10 | 10 | 10 | 10 | — |
| latent curing agent for epoxy resin | | | | | | | | |
| dicyandiamide | 0.5 | 0.5 | 0.5 | 0.5 | — | — | — | — |
| "CURESOLE 2E4MZ"*1 | — | 0.06 | — | — | 0.12 | — | — | — |
| "ACR HARDENER H-3615S"*2 | — | — | 0.06 | — | — | 0.12 | — | — |
| DCMU*3 | — | — | — | 0.06 | — | — | 0.12 | — |
| ACR Hardener H-270*4 | — | — | — | — | — | — | — | 2 |
| Adhesion (130° C. × 20 min) (cationically electrocoated plate) | | | | | | | | |
| ordinary state | | | | | | | | Δ |
| resistance to hot water*5 | | | | | | | | x |
| resistance to heat*6 | | | | | | | | x |
| Flexibility (130° C. × 20 min) | | | | | | | | x |
| Discoloration (130° C. × 20 min) | | | | | | | | x |
| Adhesion to oil-treated steel sheet (180° C. × 20 min) | | | | | | | | x |

(Notes)
*1 2-ethyl-4-methylimidazole, mfd. by Shikoku Chemical Corporation
*2 modified tertiary amine, mfd. by A. C. R.
*3 3-(3,4-dichlorophenyl)-1,1-dimethylurea, mfd. by Hodogaya Chemical Co., Ltd.
*4 polyamide amine (amine value: 300), mfd. by A. C. R.
*5 adhesion after the immersion in hot water at 40° C. for 7 days
*6 adhesion after heating at 102° C. for 3 days Test methods of the characteristics shown in Table 1-2
(1) Substrate:
 1 cationically electrocoated plate
 2 oil-treated steel sheet
(2) Application: applied with a spacer in a thickness of 2 mm
(3) Baking (cationically electrocoated plate): 130° C.×20 min
(4) Evaluation of adhesion:

| Peeling with nail | | |
|---|---|---|
| complete CF: | cohesive failure of plastisol | |
| complete AF: | adhesive failure | x |
| AF/CF: | partial cohesive and adhesive failure | Δ |
| (5) Evaluation of flexibility: | | |
| bending at 180° | no crack | |
| bending at 180° | crack | x |
| (6) Evaluation of discoloration: | | |
| the surface is white | | |
| the surface is from white to creamy | | |
| the surface is brown | | x |

(7) Adhesion to oil-treated steel sheet:
A mild steel sheet was dipped in a machine oil. The plastisol compositions were each applied to the resulting steel sheet and baked at 180° C. for 20 minutes to determine the adhesion.

The plastisol compositions of Examples 1-8 and 1-14 more strongly adhered to a Cationically electrocoated plate than that of Comparative Example 1-4 even by baking at a relatively low temperature and were remarkably improved in flexibility, discoloration resistance and storage stability at 40° C. Further, they are excellent in the adhesion to an oil-treated steel sheet.

Examples 1-15 and 1-16

The plastisol compositions of the present invention were examined for adaptability as the body sealer or undercoat of an automotive body. The results are shown in Table 1-3.

The plastisol compositions used were those prepared in a similar manner to the one described in Example 1-1.

Comparative Example 1-5

The same examination as the one described in Example 1-15 was repeated except that a composition not containing any tackifiers was used. The results are shown in Table 1-3.

TABLE 1-3

| | Example | | Comp. Example |
|---|---|---|---|
| | 1-15 | 1-16 | 1-5 |
| Composition (parts by weight) | | | |
| polyvinyl chloride powder (a) | 40 | ← | ← |
| polyvinyl chloride powder (b) | 40 | ← | ← |
| DOP | 100 | ← | ← |
| calcium carbonate (a) | 50 | ← | ← |
| calcium carbonate (b) | 50 | ← | ← |
| "AC-303"*1 | 2 | ← | ← |
| modified epoxy resin containing unsaturated and hydroxyl groups 1 | 8 | ← | — |
| blocked isocyanate 2 | 3 | ← | — |
| "ACR HARDENER H-3615S" | — | 0.1 | — |
| Peeling strength from a cationically electrocoated plate (130° C. × 20 min) | | | |
| peeling with nail | | | x |
| shear strength*2 (kg/cm²) | 17.0 | 17.5 | 5.0 |
| Initial viscosity of sol (ps/20° C.) | 340 | 345 | 400 |
| Viscosity of sol (ps/20° C.) | 345 | 350 | 450 |

TABLE 1-3-continued

|  | Example 1-15 | Example 1-16 | Comp. Example 1-5 |
|---|---|---|---|
| (after the storage at 40° C. for 3 days) |  |  |  |

It has been confirmed that the plastisol composition of the present invention is excellent in adhesion to a cationically electrocoated plate

Referential Ex 2-1

380 g of "ADEKA REIN EP-4100"and 0.2 g of diethylamine hydrochloride were fed into a four-necked flask fitted with a stirrer, a thermometer, a cooling tube and a dropper. A mixture comprising 43.2 g of acrylic acid and 0.01 g of hydroquinone was dropwise added to the flask to carry out the reaction at 90° C. for 5 hours. Thus, a modified epoxy resin 4 containing both unsaturated and hydroxy groups was obtained. This resin had an acid value 0 and an epoxy equivalent of 300.

Referential Example 2-2

430 g of "ADEKACIZER 0-130P" * and 0.2 g of diethylamine hydrochloride were fed into a four-necked flask fitted with a stirrer, a thermometer, a cooling tube and a dropper. A mixture comprising 21.6 g of acrylic acid and 0.01 g of hydroquinone was dropwise added to the flask to carry out the reaction in a similar manner to the one described in Referential Example 2-1. A modified epoxy resin 5 containing both unsaturated and hydroxyl groups was obtained. This resin had an epoxy equivalent of 650.

* "ADEKACIZER 0-130P": epoxidized soybean oil mfd. by Adeka Argus Chemical Co., Ltd., epoxy equivalent: 430.

Referential Example 2-3

| "EPIKOTE 1001"* | 450 parts by weight |
|---|---|
| diethylamine hydrochloride | 0.1 part by weight |
| methacrylic acid | 43 parts by weight |
| dioctyl phthalate | 450 parts by weight |
| monomethyl ether hydroquinone | 0.01 part by weight |

The same procedure as the one described in Referential Example 2-1 was repeated except that the above components were used as starting materials. A modified epoxy resin 6 containing both unsaturated and hydroxyl groups was obtained. This resin had an epoxy equivalent of 1900.

Referential Example 2-4

(the same as Referential Example 1-4)

Referential Example 2-5

(the same as Referential Example 1-5)

Referential Example 2-6

(the same as Referential Example 1-6)

Examples 2-1 to 2-7

A mixture comprising 60 parts of a polyvinyl chloride polymer "ZEON 121"mfd. by The Japanese Zeon Co.), 20 parts of a polyvinyl chloride polymer (b) ("Zeon 103 ZX", mfd by The Japanese Zeon Co.), 100 parts of dioctyl phthalate (DOP), 80 parts of calcium carbonate (a) "HAKUENKA CC", mfd. by Shiraishi Calcium), 20 parts of calcium carbonate (b) ("WHITEN SB", mfd. by Shiraishi Calcium), 3 parts of titanium oxide "KR-380", mfd. by Titan Kogyo K.K.), 1.5 parts of an age resistor, 0.5 part of a fluidity adjustor and the modified epoxy resin (iii) and blocked isocyanate (iv) given in Table 2-1 was kneaded and deaerated in a vacuum to obtain a polyvinyl chloride plastisol composition. This composition was applied to a mild steel sheet and caused to gel to determine the adhesion and discoloratron. Further, the composition was also stored at 40° C. and thereafter examined for adhesion. The results are shown in Table 2-1.

Comparative Examples 2-1 to 2-3

(the same as Comparative Examples 1—1 to 1-3)

TABLE 2-1

| | Example | | | | | | |
|---|---|---|---|---|---|---|---|
| | 2-1 | 2-2 | 2-3 | 2-4 | 2-5 | 2-6 | 2-7 |
| Composition (parts by weight) | | | | | | | |
| polyvinyl chloride powder (a) | 60 | ← | ← | ← | ← | ← | ← |
| polyvinyl chloride powder (b) | 20 | ← | ← | ← | ← | ← | ← |
| DOP | 100 | ← | ← | ← | ← | ← | ← |
| calcium carbonate (a) | 80 | ← | ← | ← | ← | ← | ← |
| calcium carbonate (b) | 20 | ← | ← | ← | ← | ← | ← |
| titanium oxide | 3 | ← | ← | ← | ← | ← | ← |
| age resistor | 1.5 | ← | ← | ← | ← | ← | ← |
| fluidity adjustor | 0.5 | ← | ← | ← | ← | ← | ← |
| modified epoxy resin containing unsaturated and hydroxyl groups 4 | 10 | 10 | 10 | 10 | 10 | — | — |
| modified epoxy resin containing unsaturated and hydroxyl groups 5 | — | — | — | — | — | 10 | — |
| modified epoxy resin containing unsaturated and hydroxyl groups 6 | — | — | — | — | — | — | 10 |
| blocked isocyanate 1 | 5 | — | — | 5 | — | — | — |
| blocked isocyanate 2 | — | 10 | — | 5 | 5 | 10 | 10 |
| blocked isocyanate 3 | — | — | 10 | — | 5 | — | — |
| "ADEKA RESIN EP-4100"*1 | — | — | — | — | — | — | — |
| Adhesion (180° C. × 20 min) | | | | | | | |
| ordinary state | | | | | | | |
| resistance to hot water *2 | Δ | | | | | | |
| resistance to heat *3 | Δ | | | | | | |
| Discoloration (180° C. × 20 min) | | | | | | | |
| Adhesion after the storage of 40° C. × 3 days (180° × 20 min) | | | | | | | |

(Notes)
*1epoxy resin of bisphenol A type mfd. by Asahi Denka Kogyo K. K. (epoxy equivalent: 190)
*2adhesion after the immersion in hot water at 40° C. for 7 days
*3adhesion after the heating at 102° C. for 3 days Test methods of the characteristics shown in Table 2-1
(the same as those with respect to Table 1-1)

The plastisol compositions of Comparative Examples 2-1 to 2-3 were all inferior to those of Examples 2-1 to 2-7 in adhesion and discoloration. Thus it has been confirmed that the polyvinyl chloride plastisol composition of the present invention is remarkably improved in adhesion strength, discoloration resistance and adhesion after the storage at 40° C.

Examples 2-8 to 2-14

A mixture comprising 80 parts of a vinyl chloride copolymer powder (c) "ZEON 135 J" mfd. by The Japanese Zeon Co.), 100 parts of DOP, 50 parts of calcium carbonate (a), 50 parts of calcium carbonate (b), 3 parts of titanium oxide, 1.5 parts of an age resistor, 0.5 part of a fluidity adjustor and the modified epoxy resin (iii), blocked isocyanate (iv) and latent curing agent (v)

given in Table 2-2 was kneaded and deaerated in a vacuum to obtain a polyvinyl chloride plastisol composition. This composition was examined for adhesion to a cationically electrocoated plate, discoloration and adhesion to an oil-treated steel sheet. The results are shown in Table 2-2.

Comparative Example 2-4

(the same as Comparative Example 1-4)

TABLE 2-2

|  | Example |  |  |  |  |  |  |
|---|---|---|---|---|---|---|---|
|  | 2-8 | 2-9 | 2-10 | 2-11 | 2-12 | 2-13 | 2-14 |
| Composition (parts by weight) | | | | | | | |
| polyvinyl chloride powder (c) | 80 | ← | ← | ← | ← | ← | ← |
| DOP | 100 | ← | ← | ← | ← | ← | ← |
| calcium carbonate (a) | 50 | ← | ← | ← | ← | ← | ← |
| calcium carbonate (b) | 50 | ← | ← | ← | ← | ← | ← |
| titanium oxide | 3 | ← | ← | ← | ← | ← | ← |
| age resistor | 1.5 | ← | ← | ← | ← | ← | ← |
| fluidity adjustor | 0.5 | ← | ← | ← | ← | ← | ← |
| modified epoxy resin containing unsaturated and hydroxyl groups 4 | 10 | 10 | 10 | 10 | 10 | 10 | 10 |
| blocked isocyanate 2 | 10 | 10 | 10 | 10 | 10 | 10 | 10 |
| latent curing agent | | | | | | | |
| dicyanamide | 0.5 | 0.5 | 0.5 | 0.5 | — | — | — |
| "CURESOLE 2E4MZ"*[1] | — | 0.06 | — | — | 0.12 | — | — |
| "ACR HARDENER H-3615S"*[2] | — | — | 0.06 | — | — | 0.12 | — |
| DCMU*[3] | — | — | — | 0.06 | — | — | 0.12 |
| "ACR HARDENER H-270"*[4] | — | — | — | — | — | — | — |
| Adhesion (130° C. × 20 min) (cationically electrocoated plate) | | | | | | | |
| ordinary state | | | | | | | |
| resistance to hot water*[5] | | | | | | | |
| resistance to heat*[6] | | | | | | | |
| Discoloration (130° C. × 20 min) | | | | | | | |
| Adhesion to oil-treated steel sheet (180° C. × 20 min) | | | | | | | |

(Notes)
*[1] 2-ethyl-4-methylimidazole mfd. by Shikoku Chemical Corporation
*[2] modified tertiary amine mfd. by A. C. R.
*[3] 3-(3,4-dichlorophenyl)-1,1-dimethylurea mfd. by Hodogaya Chemical Co., Ltd.
*[4] polyamideamine (amine value: 300) mfd. by A. C. R.
*[5] adhesion after the immersion in hot water at 40° C. for 7 days
*[6] adhesion after the heating at 102° C. for 3 days Test methods of the characteristics shown in Table 2—2

(the same as those with respect to Table 1-2)

The plastisol compositions of Examples 2-8 to 2-14 more strongly adhered to a cationically electrocoated plate, even after baking at a relatively low temperature than that of Comparative Example 2-4 and were remarkably improved in discoloration resistance and storage stability at 40°. Further, they were excellent in adhesion to an oil-treated steel sheet.

Examples 2-15 and 2-16

The polyvinyl chloride plastisol compositions were examined for adaptability as the body sealer and undercoat of an automotive body. The results are shown in Table 2-3.

The plastisol compositions used were those prepared in a similar manner to the one described in Example 2-1.

Comparative Example 2-5

The same examination as that described in Example 2-15 was repeated except that the plastisol composition did not contain any tackifiers. The results are shown in Table 2-3.

TABLE 2-3

|  | Example | | Comp. Example |
|---|---|---|---|
|  | 2-15 | 2-16 | 2-5 |
| Composition (parts by weight) | | | |
| polyvinyl chloride powder (a) | 40 | ← | ← |
| polyvinyl chloride powder (b) | 40 | ← | ← |
| DOP | 100 | ← | ← |
| calcium carbonate (a) | 50 | ← | ← |
| calcium carbonate (b) | 50 | ← | ← |
| "AC-303"*[1] | 2 | ← | ← |
| modified epoxy resin containing unsaturated and hydroxyl groups 4 | 8 | ← | — |
| blocked isocyanate 2 | 3 | ← | — |
| "ACR HARDENER H-3615S" | — | 0.1 | — |
| Peeling strength from cationically electrocoated plate (130° C. × 20 min) | | | |
| peeling with nail | | | x |
| shear strength*[2] (kg/cm²) | 16.0 | 17.0 | 5.0 |
| Initial viscosity of sol (ps/20° C.) | 350 | 370 | 400 |
| Viscosity of sol (ps/20° C.) (after the storage at 40° C. for 3 days) | 360 | 380 | 450 |

*[1] Ba-Bu stabilizer, mfd. by Adeka Argus Chemical Co., Ltd.
*[2] A polyvinyl chloride plastisol composition was applied to two electrocoated plates in a thickness of 0.5 mm. The resulting plates were piled up to obtain a sandwich. This sandwich was baked at 130° C. for 20 minutes and used in the test.

It has been confirmed that the polyvinyl chloride plastisol composition of the present invention is excellent in adhesion to a cationically electrocoated plate.

Referential Example 3-1

(the same as Referential Example 1-4)

Referential Example 3-2

(the same as Referential Example 1-5)

Referential Example 3-3

(the same as Referential Example 1-6)

Examples 3-1 to 3-7

A mixture comprising 60 parts of a polyvinyl chloride polymer (a) ("ZEON 121", mfd by The Japanese Zeon Co.), 20 parts of a polyvinyl chloride powder (b) ("ZEON 103 ZX", mfd. by The Japanese Zeon Co.), 100 parts of dioctyl phthalate (DOP), 80 parts of calcium carbonate (a) "HAKUENKA CC", mfd. by Shiraishi Calcium), 20 parts of calcium carbonate (b) ("WHITEN SB", by Shiraishi Calcium), 3 parts of titanium oxide ("R-380", mfd. by Titan Kogyo K.K.), 1.5 parts of an age resistor, 0.5 part of a fluidity adjustor and the tackifiers given in Table 3-1 was kneaded and deaerated in a vacuum to obtain a polyvinyl chloride plastisol composition. This composition was applied to a mild steel sheet and caused to gel to determine the adhesion and discoloration. The results are shown in Table 3-1.

Comparative Examples 3-1 to 3-4

The same procedure as the one described in Examples 3-1 to 3-7 was repeated except that a part of the tackifiers was not contained in the composition used as shown in Table 3-1. The results are shown in Table 3-1.

It has been confirmed that a polyvinyl chloride plastisol composition lacking even one out of the tackifiers according to the present invention, i.e., epoxy resin, blocked isocyanate and latent curing agent, such as those of Comparative Examples 3-1 to 3-4 is poor in adhesion and discoloration as compared with the composition of the present invention such as those of Examples 3-1 to 3-7. Thus it has been confirmed that the polyvinyl chloride plastisol composition of the present invention is remarkably improved in adhesive strength and discoloration.

Examples 3-8 to 3-13

A mixture comprising 80 parts of a vinyl chloride copolymer powder (c) ("ZEON 135 J", mfd. by The Japanese Zeon Co.), 100 parts of DOP, 50 parts of calcium carbonate (a), 50 parts of calcium carbonate (b), 3 parts of titanium oxide, 1.5 parts of an age resistor, 0.5 part of a fluidity adjustor and the tackifiers given in Table 3-2 was kneaded and deaerated in a vacuum to obtain a plastisol composition. This composition was applied to a mild steel sheet to determine the adhesion and discoloration. Further, the resulting sheet was stored at a room temperature for 15 days to determine the blowing and adhesion. The results are shown in Table 3-2.

TABLE 3-1

|  | Example | | | | | | | Comp. Example | | | |
|---|---|---|---|---|---|---|---|---|---|---|---|
|  | 3-1 | 3-2 | 3-3 | 3-4 | 3-5 | 3-6 | 3-7 | 3-1 | 3-2 | 3-3 | 3-4 |
| polyvinyl chloride powder (a) | 60 | ← | ← | ← | ← | ← | ← | 60 | ← | ← | ← |
| polyvinyl chloride powder (b) | 20 | ← | ← | ← | ← | ← | ← | 20 | ← | ← | ← |
| DOP | 100 | ← | ← | ← | ← | ← | ← | 100 | ← | ← | ← |
| calcium carbonate (a) | 80 | ← | ← | ← | ← | ← | ← | 80 | ← | ← | ← |
| calcium carbonate (b) | 20 | ← | ← | ← | ← | ← | ← | 20 | ← | ← | ← |
| titanium oxide | 3 | ← | ← | ← | ← | ← | ← | 3 | ← | ← | ← |
| age resistor | 1.5 | ← | ← | ← | ← | ← | ← | 1.5 | ← | ← | ← |
| fluidity adjustor | 0.5 | ← | ← | ← | ← | ← | ← | 0.5 | ← | ← | ← |
| Tackifer | | | | | | | | | | | |
| "ADEKA RESIN EP-4100"*[1] | 10 | 10 | 10 | 10 | 10 | 10 | 10 | 10 | — | 10 | — |
| blocked isocyanate 1 | 5 | 5 | — | — | — | — | 5 | — | 5 | — | — |
| blocked isocyanate 2 | — | — | 10 | 10 | 10 | 10 | 5 | — | — | 10 | 10 |
| dicyandiamide | 0.7 | 0.7 | 0.7 | 0.7 | — | — | — | 0.7 | — | — | — |
| "CURESOLE 2E4MZ"*[2] | — | 0.1 | — | — | 0.2 | — | — | 0.1 | — | — | — |
| "ACR HARDENER H3615S"*[3] | — | — | — | 0.1 | — | 1.5 | — | — | — | — | — |
| adipodihydrazide | — | — | — | — | — | — | 2.5 | — | — | — | — |
| Adhesion (180° C. × 20 min) | | | | | | | | | | | |
| ordinary state | | | | | | | | x | x | Δ | Δ |
| resistance to hot water*[4] | Δ | | | | | | | x | x | Δ | x |
| resistance to heat*[5] | Δ | | | | | | | x | x | Δ | x |
| Discoloration (180° C. × 20 min) | | | | | | | | x | x | x | x |

*[1] epoxy resin of bisphenol A type (epoxy equivalent: 190), mfd. by Asahi Denka Kogyo K. K.
*[2] 2-ethyl-4-methylimidazole, mfd. by Shikoku Chemical Corporation
*[3] modified amine, mfd. by A. C. R.
*[4] adhesion after the immersion in hot water at 40° C. for 7 days
*[5] adhesion after the heating at 102° C. for 3 days Comparative Example 3-5
(the same as Comparative Example 1-4

TABLE 3-2

|  | Example | | | | | |
|---|---|---|---|---|---|---|
|  | 8 | 9 | 10 | 11 | 12 | 13 |
| polyvinyl chloride powder (c) | 80 | ← | ← | ← | ← | ← |
| DOP | 100 | ← | ← | ← | ← | ← |
| calcium carbonate (a) | 50 | ← | ← | ← | ← | ← |
| calcium carbonate (b) | 50 | ← | ← | ← | ← | ← |
| titanium oxide | 3 | ← | ← | ← | ← | ← |
| age resistor | 1.5 | ← | ← | ← | ← | ← |
| fluidity adjustor | 0.5 | ← | ← | ← | ← | ← |
| Tackifier (iii) | | | | | | |
| "ADEKA RESIN EP-4100" | 10 | — | — | 10 | 10 | 10 |
| "ADEKACIZER O-130P"*[1] | — | 10 | — | — | — | — |
| "R-45EPI"*[2] | — | — | 10 | — | — | — |
| blocked isocyanate 2 | 10 | 10 | 10 | — | — | 5 |

TABLE 3-2-continued

| | Example | | | | | |
|---|---|---|---|---|---|---|
| | 8 | 9 | 10 | 11 | 12 | 13 |
| blocked isocyanate 3 | — | — | — | 10 | 10 | 5 |
| "CURESOLE C<sub>11</sub>ZAZINE"*3 | 0.2 | 0.2 | 0.2 | — | — | — |
| BF<sub>3</sub>-monoethylamine complex | — | — | — | 0.2 | — | — |
| "DCMU"*4 | — | — | — | — | 0.3 | 0.3 |
| "ACR HARDENER H-270" | | | | | | |
| Adhesion to a mild steel sheet (160° C. × 20 min) | | | | | | |
| Discoloration (160° C. × 20 min) | | | | | | |
| owing after the storage at a room temperature for 15 days | | | | | | |
| Adhesion after the storage at a room temperature for 15 days (160° C. × 20 min) | | | | | | |

(Notes)
*1epoxidized soybean oil (epoxy equivalent: 430), mfd. by Adeka Argus Chemical Co., Ltd.
*2epoxidized polybutadiene (epoxy equivalent: 200), mfd. by Idemitsu Petrochemical Co., Ltd.
*3a product of Shikoku Chemical Corporation
*43-(3,4-dichlorophenyl)-1,1-dimethylurea Test methods of the characteristics shown in Table 3-2

1. Substrate: mild steel sheet
2. Application: applied with a spacer in a thickness
3. Baking: 160° C.×20 min
4. Evaluation of adhesion: Peeling with nail Peeling with nail
- complete CF: cohesive failure of plastisol
- complete AF: adhesive failure    x
- AF/CF: partial cohesive and adhesive failure    Δ

5. Evaluation of discoloration:
   - the surface is white
   - the surface is from white to creamy
   - the surface is brown    x
6. Evaluation of blowing
   - nearly no bubbles
   - many bubbles    x
   - a few bubbles    Δ

The above characteristics were evaluated by observing the cut area of the coating which had been baked at 160° C. for 20 minutes with the naked eyes.

Example 3-14

A polyvinyl chloride plastisol composition of the present invention was examined for adaptability as the body sealer and undercoat of an automotive body. The results are shown in Table 3—3.

The plastisol composition used was one prepared in a similar manner to the on described in Example 3-1.

Comparative Example 3-6

The same examination as the one described in Example 3-14 was repeated except that the composition did not contain any tackifiers. The results are shown in Table 3-3.

TABLE 3-3

| | Example 3-14 | Comp. Example 3-6 |
|---|---|---|
| Polyvinyl chloride powder (a) | 40 | ← |
| Polyvinyl chloride powder (b) | 40 | ← |
| DOP | 100 | ← |
| Calcium carbonate (a) | 50 | ← |
| Calcium carbonate (b) | 50 | ← |
| "AC-303"*1 | 2 | ← |
| Tackifier (iii) | | |
| "EP-4100" | 8 | — |
| blocked isocyanate 2 | 3 | — |
| "CURESOLE 2MZ"*2 | 0.1 | — |
| Peeling strength from cationically electrocoated plate (130° C. × 20 min) | | |
| peeling with nail | | x |
| shear strength (kg/cm<sup>2</sup>) | 17.0 | 5.0 |
| Initial viscosity of sol (ps/20° C.) | 310 | 400 |
| Viscosity of sol (ps/20° C.) (after the storage at 40° C. for 3 days) | 315 | 450 |

It has been confirmed that the polyvinyl chloride plastisol composition of the present invention is excellent in adhesion to a cationically electrocoated plate.

What is claimed is:

1. A polyvinyl chloride plastisol composition comprising
   (i) 10 to 50% by weight of a vinyl chloride polymer and/or copolymer,
   (ii) 10 to 50% by weight of a plasticizer,
   (iii) a modified epoxy resin containing both unsaturated and hydroxy groups which is prepared by reacting (iii-1) an epoxy resin having more than one adjacent epoxy groups on an average in its molecule with (iii-2) an unsaturated alilphatic acid, and
   (iv) a blocked isocyanate as essential components, said blocked isocyanate being prepared in a reaction in which a blocking agent is used in an amount of 1 to 2 times the equivalent amount of free isocyanate groups, the total amount of (iii) the modified epoxy resin and (iv) the blocked isocyanate being 0.1 to 30% by weight and the weight ratio of (iii) the modified epoxy resin to (iv) the blocked isocyanate being between 95:5 to 5:95, said % by weight being based on the weight of the plastisol composition.

2. A polyvinyl chloride plastisol composition comprising
   (i) 10 to 50% by weight of a vinyl chloride polymer and/or copolymer,
   (ii) 10 to 50% by weight of a plasticizer,
   (iii) (iii-1) an epoxy resin having more than one adjacent epoxy groups on an average in its molecule or (iii-3) a modified epoxy resin containing both unsaturated and hydroxyl groups which is prepared by reacting (iii-1) an epoxy resin having more than one adjacent epoxy groups on an average in its molecule with (iii-2) an unsaturated aliphatic acid,
   (iv) a blocked isocyanate, said blocked isocyanate being prepared in a reaction in which a blocking agent is used in an amount of 1 to 2 times the equivalent amount of free isocyanate groups, the total amount of (iii) the modified epoxy resin and (iv) the blocked isocyanate being 0.1 to 30% by weight and the weight ratio of (iii) the modified epoxy resin to (iv) the blocked isocyanate being between 95:5 to 5:95, and (v) a latent curing agent for an epoxy resin as essential components, the amount of (v) the latent curing agent being from 0.3 to 50 parts by weight per 100 parts by weight of said total amount of (iii) the modified epoxy resin and (iv) the blocked isocyanate, said % by weight being based on the weight of the plastisol composition.

3. The polyvinyl chloride plastisol composition of claim 1, wherein said vinyl chloride polymer and/or copolymer is contained in said plastisol composition in an amount of from 20 to 40% by weight, said plasticizer is contained in said plastisol composition in an amount of from 20 to 40% by weight and the total amount of the modified epoxy resin and the blocked isocyanate is from 0.5 to 15% by weight, said % by weight being based on the weight of the plastisol composition.

4. The polyvinyl chloride plastisol composition of claim 2, wherein said vinyl chloride polymer and/or copolymer is contained in said plastisol composition in an amount of from 20 to 40% by weight, said plasticizer is contained in said plastisol composition in an amount of from 20 to 40% by weight and the total amount of the modified epoxy resin and the blocked isocyanate is from 0.5 to 15% by weight, said % by weight being based on the weight of the plastisol composition.

5. The polyvinyl chloride plastisol composition of claim 1, wherein said plasticizer is dioctyl phthalate, said modified epoxy resin is a modified bisphenol A epoxy resin and said blocked isocyanate is a blocked toluylene diisocyanate.

6. The polyvinyl chloride plastisol composition of claim 2, wherein said plasticizer is dioctyl phthalate, said modified epoxy resin is a modified bisphenol A epoxy resin, said blocked isocyanate is a blocked toluylene diisocyanate and said latent curing agent is dicyandiamide.

7. The polyvinyl chloride plastisol composition of claim 1, wherein said plasticizer is dioctyl phthalate.

8. The polyvinyl chloride plastisol composition of claim 2, wherein said plasticizer is dioctyl phthalate.

9. The polyvinyl chloride plastisol composition of claim 2, wherein (iii) is (iii-3) a modified epoxy resin containing both unsaturated and hydroxyl groups.

10. The polyvinyl chloride plastisol composition of claim 1, wherein said blocked isocyanate is totally blocked.

11. The polyvinyl chloride plastisol composition of claim 2, wherein said blocked isocyanate is totally blocked.

* * * * *

UNITED STATES PATENT AND TRADEMARK OFFICE
CERTIFICATE OF CORRECTION

PATENT NO. : 4 977 201

DATED : December 11, 1990

INVENTOR(S) : Akio OGAWA et al

It is certified that error appears in the above-identified patent and that said Letters Patent is hereby corrected as shown below:

Column 28, line 42; change "alilphatic" to
---aliphatic---.

Signed and Sealed this

Twenty-seventh Day of October, 1992

Attest:

DOUGLAS B. COMER

Attesting Officer

Acting Commissioner of Patents and Trademarks